(12) United States Patent
Barron et al.

(10) Patent No.: US 10,614,076 B2
(45) Date of Patent: Apr. 7, 2020

(54) MODIFICATION OF GROUND TRUTH TABLES BASED ON REAL-TIME USER INTERACTION

(71) Applicant: International Business Machines Corporation, Armonk, NY (US)

(72) Inventors: Gilbert Barron, South Salem, NY (US); Michael J. Bordash, Newtown, CT (US); Lisa Seacat DeLuca, Baltimore, MD (US); Louis F. Roehrs, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 15/240,361

(22) Filed: Aug. 18, 2016

(65) Prior Publication Data
US 2018/0052848 A1 Feb. 22, 2018

(51) Int. Cl.
*G06F 17/30* (2006.01)
*G06F 16/2457* (2019.01)
*G06Q 30/06* (2012.01)
*G06F 16/2455* (2019.01)

(52) U.S. Cl.
CPC .... *G06F 16/24578* (2019.01); *G06F 16/2455* (2019.01); *G06Q 30/0625* (2013.01)

(58) Field of Classification Search
None
See application file for complete search history.

(56) References Cited

U.S. PATENT DOCUMENTS

| | | | |
|---|---|---|---|
| 2005/0165829 A1* | 7/2005 | Varasano | G06F 17/211 |
| 2014/0067786 A1 | 3/2014 | Newey et al. | |
| 2015/0142827 A1 | 5/2015 | Hasan et al. | |
| 2015/0317310 A1 | 11/2015 | Glass et al. | |
| 2017/0201779 A1* | 7/2017 | Publicover | H04W 4/21 |

* cited by examiner

*Primary Examiner* — Tuankhanh D Phan
(74) *Attorney, Agent, or Firm* — Isaac J. Gooshaw; Maxine L. Barasch; Keohane & D'Alessandro PLLC

(57) ABSTRACT

In embodiments, a ground truth table is used to help determine the relevance of a set of search results from a search query. The ground truth table comprises numerous items, along with a corresponding relevancy ranking for each item. Based on the user interaction with the set of search results, the ground truth table is modified, such that subsequent search queries provide improved results over time. The user interactions can include a click-through action, in which case a user clicked on (or otherwise selected) a search result entry. The user interactions can include a purchase action, wish list addition action, favorite list addition action, and/or a share action, among others. Based on the user interactions, the ranking of an entry in the ground truth table is adjusted. Then, subsequent searches that use the modified ground truth table can provide improved search results.

20 Claims, 7 Drawing Sheets

MODIFICATION OF GROUND TRUTH TABLES BASED ON REAL-TIME USER INTERACTION

FIELD OF THE INVENTION

The present invention relates to modification of ground truth table values based on real-time user interaction.

BACKGROUND

People get a great deal of information today by searching online. People search for consumer products, events going on in their area, and health information, etc. With busy lives, and small user device screens, inefficient organization or inaccuracy of search results means wasted screen space and time. Accordingly, there exists a need for systems and methods resulting in better optimization of search results.

SUMMARY

In embodiments, a ground truth table is used to help determine the relevance of a set of search results from a search query. The ground truth table comprises numerous items, along with a corresponding relevance ranking for each item. Based on the user interactions with the set of search results, the ranking of an entry in the ground truth table is adjusted, such that subsequent search queries provide improved results over time. The user interactions can include a click-through action, in which case a user clicked on (or otherwise selected) a search result entry. The user interactions can include a purchase action, wish list addition action, favorite list addition action, and/or a share action, among others. Based on the user interactions, the ranking of an entry in the ground truth table is adjusted. Then, subsequent searches that use the modified ground truth table can provide improved search results.

In one aspect, there is provided a computer-implemented method for processing a search query, comprising: receiving the search query from a user; associating the search query with an entry from a ground truth table; retrieving a set of search results from the ground truth table; recording an interaction of the user with the set of search results; and modifying the ground truth table based on the interaction of the user.

In another aspect, there is provided a system for processing a search query, comprising: a search query server, the search query server comprising: a processor; a memory coupled to the processor, wherein the memory contains instructions, that when executed by the processor, perform the steps of: receiving the search query from a user; associating the search query with an entry from a ground truth table; retrieving a set of search results from the ground truth table; recording an interaction of the user with the set of search results; and modifying the ground truth table based on the recorded interaction of the user.

In yet another aspect, there is provided a computer program product for processing a search query on an electronic device, comprising a computer readable storage medium having program instructions embodied therewith, the program instructions executable by a processor to cause the electronic device to: receive the search query from a user; associate the search query with an entry from a ground truth table; retrieve a set of search results from the ground truth table; record an interaction of the user with the set of search results; and modify the ground truth table based on the interaction of the user.

BRIEF DESCRIPTION OF THE DRAWINGS

Features of the disclosed embodiments will be more readily understood from the following detailed description of the various aspects of the invention taken in conjunction with the accompanying drawings.

Figure 1:
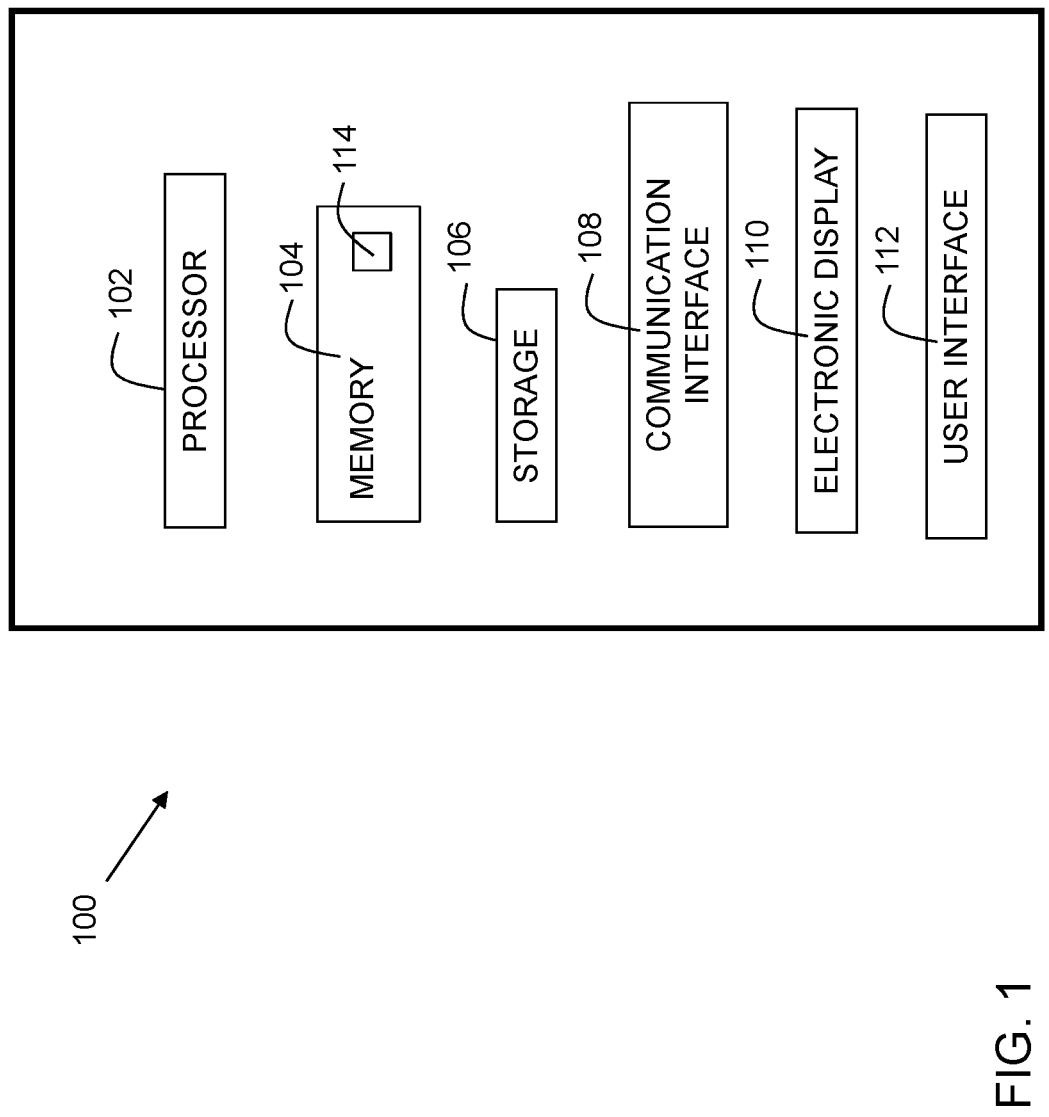
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

In embodiments, a ground truth table is used to help determine the relevance of a set of search results from a search query. The ground truth table comprises numerous items, along with a corresponding relevancy ranking for each item. Based on the user interaction with the set of search results, the ground truth table is modified, such that subsequent search queries provide improved results over time. The user interactions can include a click-through action, in which case a user clicked on (or otherwise selected) a search result entry. The user interactions can include a purchase action, in which case a user purchased an item designated in a search result entry. The user interactions can include a wish list addition action, in which case a user added an item designated in a search result entry to a wish list. The user interactions can include a favorite list addition action, in which case a user added an item designated in a search result entry to a favorite list. The user interactions can include a share action, in which case a user shared an item designated in a search result entry. This is a non-exhaustive list of user interactions, and other user interactions are possible and included within the scope of the invention. Based on the user interactions, the ranking of an entry in the ground truth table is adjusted. For example, if a particular entry is clicked through by many users, its ranking in the ground truth table can be increased to reflect increased relevance. Similarly, if a particular entry is rarely clicked on by a user, then its ranking in the ground truth table can be decreased to signify reduced relevance. Then, subsequent searches that use the modified ground truth table can provide improved search results.

FIG. 1 is a block diagram of a device 100 in accordance with embodiments of the present invention. Device 100 includes a processor 102. The processor 102 may include one or more processing cores. Device 100 further includes memory 104. The memory 104 is coupled to the processor such that instructions stored in memory 104 can be executed by the processor 102 to implement aspects of disclosed embodiments. The memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Instructions 114 may reside in memory 104. Instructions 114 may comprise one or more modules configured to perform tasks and/or steps for carrying out embodiments of the present invention. Device 100 may further include additional storage 106. Additional storage 106 may include, but is not limited to, solid state storage such as SRAM, Flash, and/or magnetic or optical storage. Device 100 further includes a communication interface 108. The communication interface 108 provides networking capability, and may support a variety of protocols, including, but not limited to, WiFi, Bluetooth™, Ethernet, TCP/IP, UDP, and/or other protocols and/or standards for communication. In embodiments, the communication interface 108 includes a Bluetooth™ transceiver. Device 100 further includes an electronic display 110. The electronic display 110 may include a liquid crystal display (LCD), a plasma display, a cathode ray tube (CRT) display, a light emitting diode (LED) display, an organic LED (OLED) display, or other suitable display technology. Device 100 further includes a user interface 112. In some embodiments, user interface 112 may be a touch screen, and in some embodiments, may include a capacitive and/or resistive touch screen. The user interface includes fields for a user to enter text into an application such as a search engine, knowledge-based system, and/or web browser.

Figure 2:
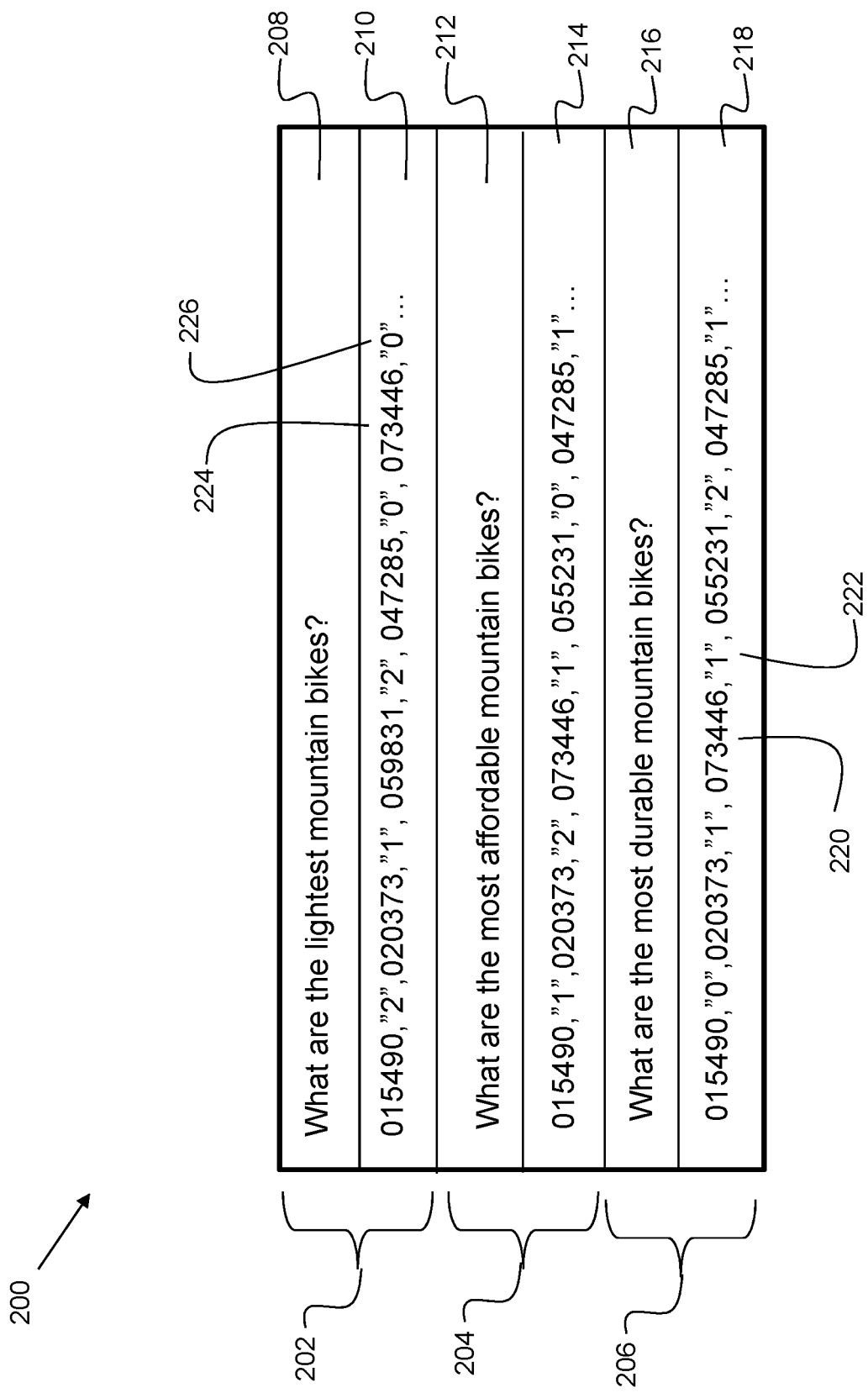
FIG. 2 is an exemplary ground truth table in accordance with embodiments of the present invention.

FIG. 2 is an exemplary ground truth table 200 in accordance with embodiments of the present invention. Ground truth data as used herein refers to training-data for supervised learning techniques. With embodiments of the present invention, the ground truth data, which is represented in a ground truth table (GTT), is modified based on user interaction with results obtained from the GTT.

In the example shown, the ground truth data includes 3 entries, represented at 202, 204, and 206. Each entry includes a statement and a set of (at least one) search results. The search results may comprise a plurality of tuples, wherein each tuple comprises an item identifier, a non-limiting example of which is a SKU (stock keeping unit) number, and a rank value associated with the item identifier. The statements represent search queries. In the example, entry 202 includes statement 208: "What are the lightest mountain bikes?" Entry 202 also includes corresponding search results 210. Entry 204 includes the statement 212: "What are the most affordable mountain bikes?" Entry 204 also includes corresponding search results 214. Entry 206 includes the statement 216: "What are the most durable mountain bikes?" Entry 206 also includes corresponding search results 218.

In search results 210, rank/weight values of various items generated by a search of statement 208 are rendered. In the example, for statement 208, the item, bike SKU 015490, has a rank value of "2". For that statement, the item, bike SKU 020373, has a rank value of "1". Bike SKU 073446 has a rank value of "0", bike SKU 059831 has a rank value of "2", and bike SKU 047285 has a rank value of "0". As shown in the truth table 200, the same items are ranked differently for statement 212 in entry 204 and statement 216 in entry 206. For example, for statement 216, bike SKU 073446 (see reference 220), has a rank value of "1" (see reference 222), whereas that same SKU (see reference number 224) has a rank value of "0" (see reference 226) for statement 208.

Figure 3:
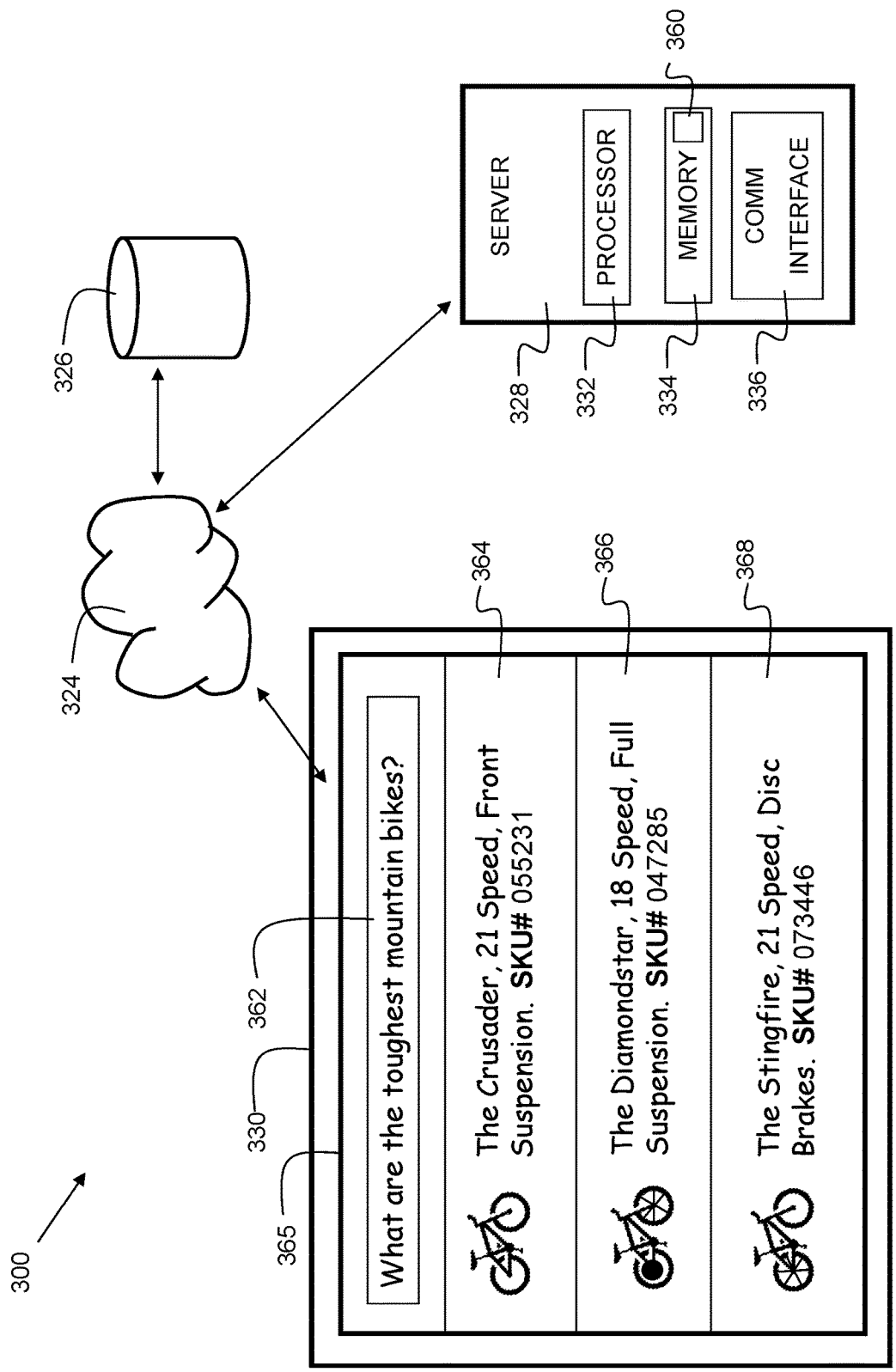
FIG. 3 shows a system in accordance with embodiments of the present invention.

FIG. 3 shows a system 300 in accordance with embodiments of the present invention. A server 328 and client device 330 are in communication over network 324. In embodiments, server 328 may be a search query server that returns a set of search results from a user-supplied search query. The server 328 may include a processor 332, memory 334 including ground truth table 360 stored therein, and communications interface 336. In embodiments, network 324 may be the Internet, a local area network (LAN), wide area network (WAN), cellular network, cloud network, or another suitable network. In embodiments, ground truth table 360 may be a data table including the ground truth data. In some embodiments, the ground truth data may be stored in one or more tables accessible using a Structured Query Language (SQL) query. Client device 330 may be a desktop computer, tablet computer, smartphone, or other suitable device for accessing a search engine and/or web browser. Other devices may be in communication, as well, over the network, for example, device 326. In embodiments, device 326 may include supplemental data storage, an e-commerce system, and/or a social media system. Thus, user actions such as purchases via an e-commerce system and/or sharing of a link to an item via a social media system can be reported to server 328 via network 324.

In an example implementation, a user enters a search query to a field 362 of search engine browser page 365 via client device 330. The query may say "What are the toughest mountain bikes". The server associates such query with statement stored in the ground truth table 360: "What are the toughest mountain bikes?" Three items 364, 366, and 368 are generated as results from a run of the statement in the search engine. The items are displayed on the user device screen in order of highest weighted value to lowest weighted value based on the ground truth data in the ground truth table 360. The user's interactions with the results are monitored, and the associated values in the ground truth table 360 are adjusted accordingly. In some embodiments, recording an interaction of the user comprises recording a click-through action. In such example, when it is detected that a user clicks (or otherwise selects) a search result, the ranking is elevated. Example user interactions are as follows.

In some embodiments, recording an interaction of the user comprises recording a purchase made by the user of a related item to the search results. In such example, when it is detected that a user has purchased an item in a search result, the ranking of that item is elevated with respect to other items.

In some embodiments, recording an interaction of the user comprises recording a wish list addition action. In such example, when it is detected that a user has placed an item from a search result into a "wish list", the ranking of that item is elevated with respect to other items. A "wish list" is an electronic list of products or services that a user is interested in, and would like to purchase.

In some embodiments, recording an interaction of the user comprises recording a favorite list addition action. In such example, when it is detected that a user has marked an item from a search result to its favorites list, the ranking of that item is elevated with respect to other items. A "favorites list" is an electronic list of links to documents, websites, files, etc. that a user has marked as "favorite", usually to ease accessing the particular document, website, or file.

In some embodiments, recording an interaction of the user comprises recording a share action. In such example, when it is detected that a user has shared an item from a search result, for example on a social networking website, the ranking of that item is elevated with respect to other items.

In some embodiments, recording an interaction of the user comprises recording a duration spent by the user browsing items in the set of search results. In such example, when it is detected that a user exceeds a predetermined amount of time on a webpage associated with an item from a search result, the ranking of that item is elevated with respect to other items. In another example, the ranking of the item may be elevated when a user exceeds a predetermined threshold amount of time viewing a webpage associated with an item. Elevations can occur based on thresholds at various increments, for example, at 30 seconds, 2 minutes, and 5 minutes.

In some embodiments, recording an interaction of the user comprises recording a number of accesses by the user of the set of search results. In such example, when it is detected that a user has clicked through to a webpage associated with an item from a search result, the ranking of that item is elevated with respect to other items.

In an embodiment, the ranking value R within a ground truth table may be adjusted by the following formula:

$$R = K_1 C + K_2 T + K_3 P$$

Where $K_1$, $K_2$, and $K_3$ are constants; C is a Boolean value representing a click through of a search result, T is a value indicative of time spent with that search result page open, and P is a Boolean value indicative of a purchase of the item. This is an exemplary formula, and others may be substituted within the scope of the invention. Since the rank values are relative, as one item is raised in rank, another or others are correspondingly, lowered accordingly on the relative scale.

Figure 4:
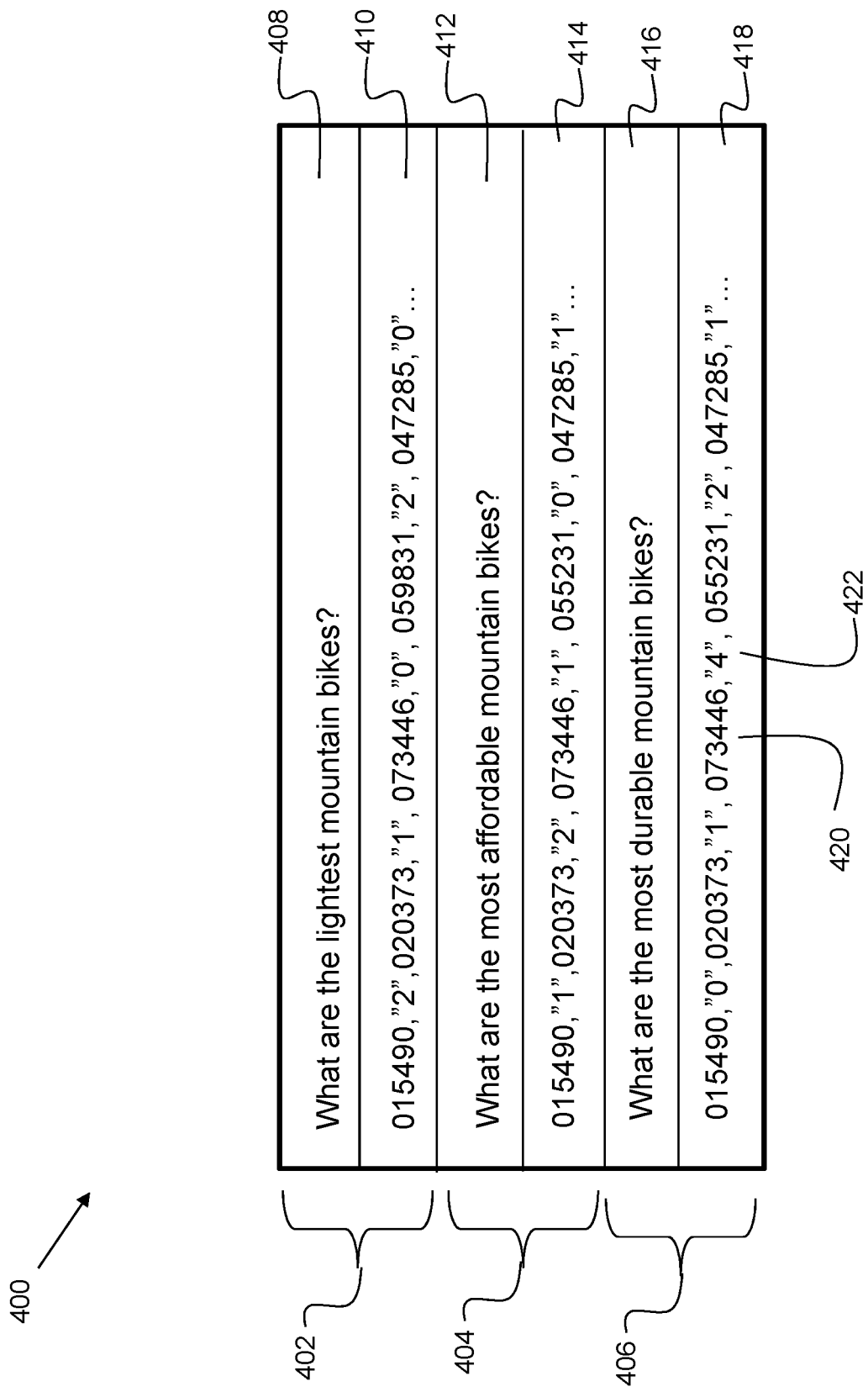
FIG. 4 is a block diagram of modules in accordance with embodiments of the present invention.

FIG. 4 is an exemplary modified ground truth table 400 in accordance with embodiments of the present invention. Similar to as shown in FIG. 2, the ground truth data includes 3 entries, represented at 402, 404, and 406. Each entry includes a statement and search results. The search results may comprise a plurality of tuples, wherein each tuple comprises an item identifier, such as a SKU number, and a rank value. The statements represent search queries. In the example, entry 402 includes statement 408: "What are the lightest mountain bikes?" Entry 402 also includes corresponding search results 410. Entry 404 includes the statement 412: "What are the most affordable mountain bikes?" Entry 402 also includes corresponding search results 414. Entry 406 includes the statement 416: "What are the most durable mountain bikes?" Entry 406 also includes corresponding search results 418.

In embodiments, a search query is received from a user. The search query is associated with an entry from a ground truth table. A set of search results is retrieved from the ground truth table. An interaction of the user with the set of search results is recorded. The ground truth table is modified based on the interaction of the user. Modifying the ground truth table includes adjusting a ranking within an entry of the ground truth table. The adjusting a ranking within an entry of the ground truth table can comprise decreasing the ranking of the entry. The adjusting a ranking within an entry of the ground truth table can comprise increasing the ranking of the entry. For example, the user in FIG. 3 clicked on item 368 (corresponding to bike SKU 073446) in the search results. The ground truth table is then modified based thereon. As shown in FIG. 2, the item 220 (for bike SKU 073446) was ranked as "1" at 222, and as shown in FIG. 4, the item 420 (for bike SKU 073446) was adjusted to "4" at 422. In search results for a subsequent query similar to the query entered by the user, the item for bike SKU 073446 will be shown higher in the results than shown at FIG. 3 based on the adjustment. An example of this is shown at reference number 764 in FIG. 7. It should be recognized that although the example is described in relation to a single user, the ground truth table adjustments are performed on aggregated data from multiple users.

Figure 5:
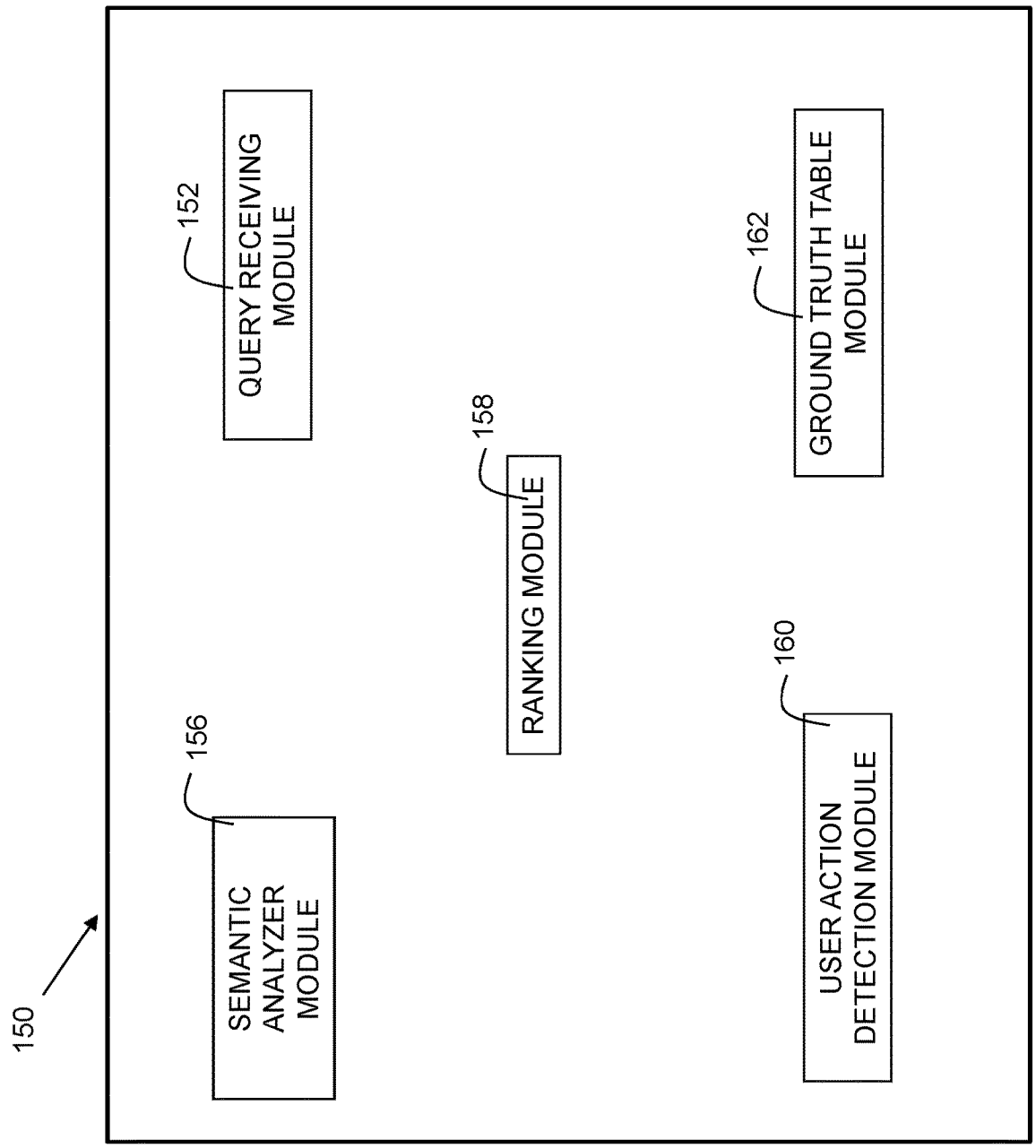
FIG. 5 is an exemplary modified ground truth table in accordance with embodiments of the present invention.

FIG. 5 is a block diagram 150 of modules in accordance with embodiments of the present invention. The modules may be implemented by instructions 114 in memory 104 (FIG. 1). Query receiving module 152 receives search queries from users. It can be received therein through a field in a user interface on a screen. The modules can associate a search query with an entry from a ground truth table. The semantic analyzer module 156 can be used to associate a human-entered search query with a ground truth table entry. For example, in FIG. 3, the search query is intended to retrieve results for the "toughest" mountain bikes. In embodiments, the semantic analyzer module 156 may perform synonym processing. This enables the system to associate words in a query with synonymous words in statements in the ground truth table. For example, the word "toughest" may be associated with "durable" from ground truth table entry 206 (FIG. 2). Thus, when the user searches for the "toughest" mountain bikes, the human-entered query is associated with query statement 216 of FIG. 2, and the returned set of search results includes the results of data set 218 of FIG. 2. Ranking module 158 ranks search results. This may include sorting search results based on the ranking value of each tuple within an entry. In embodiments, the search results may be sorted from the highest rank value (most relevant) to the lowest ranking value (least relevant). User action detection module 160 detects user interaction with search results. Ground truth table module 162 includes the ground truth data. In some embodiments, ground truth table module 162 may perform modifications on the ground truth table such as creating a new entry in the ground truth table if the association of the search query returns a value below a predetermined threshold. Thus, if a user enters a query that does not associate with a statement of a current entry in the ground truth table, a new entry may be added to the ground truth table, with the statement being the query entered from the user.

Figure 6:
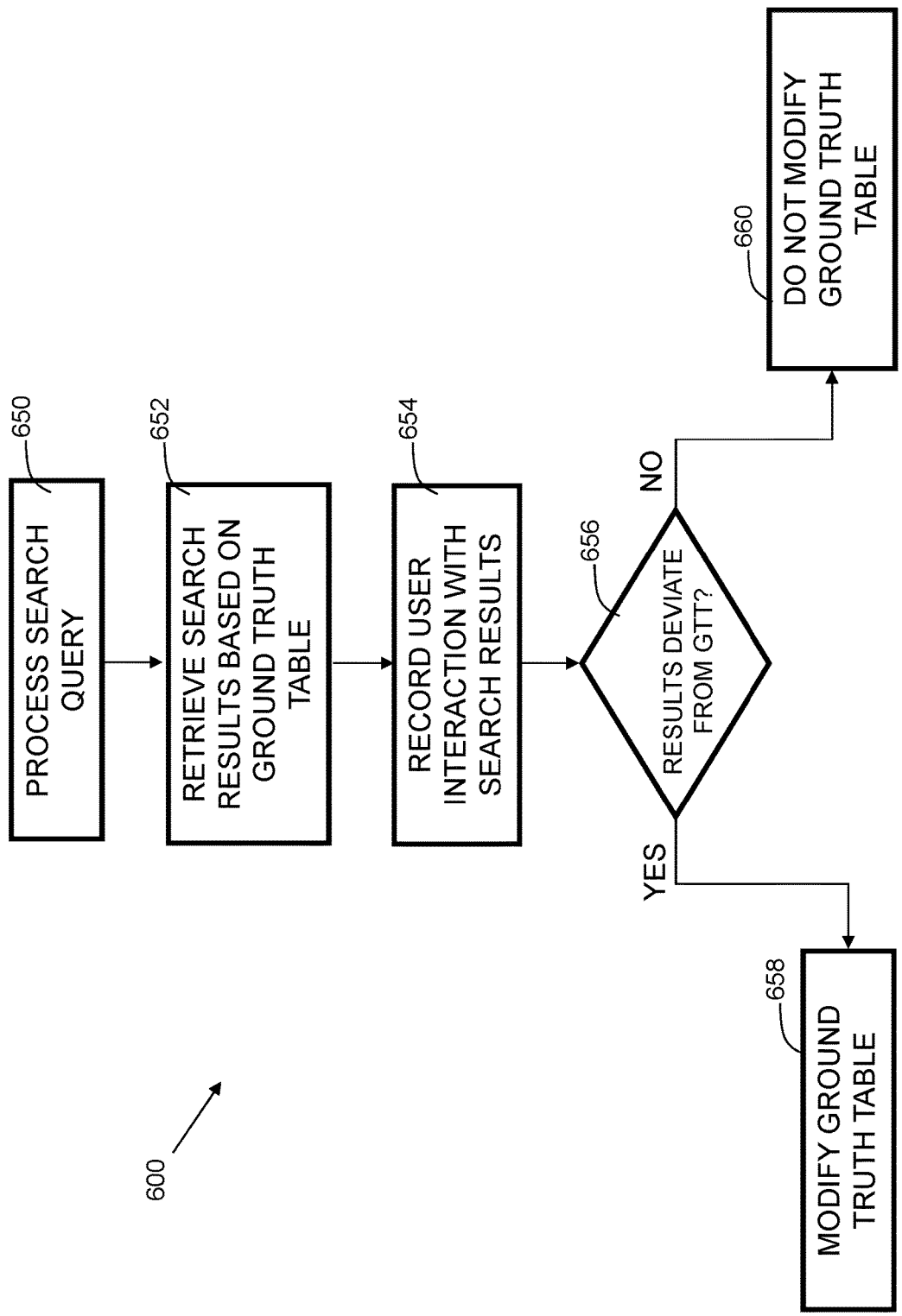
FIG. 6 is a flowchart indicating process steps in accordance with embodiments of the present invention.

FIG. 6 is a flowchart 600 indicating process steps in accordance with embodiments of the present invention. A search query is processed, at 650. Search results are retrieved based on the ground truth table, at 652. User interactions with the search results are recorded, at 654. It is determined whether the user interactions with the results deviate from the current rankings in the ground truth table, at 656. If no, the ground truth table is not modified, at 660. If yes, the ground truth table is modified at 658.

Figure 7:
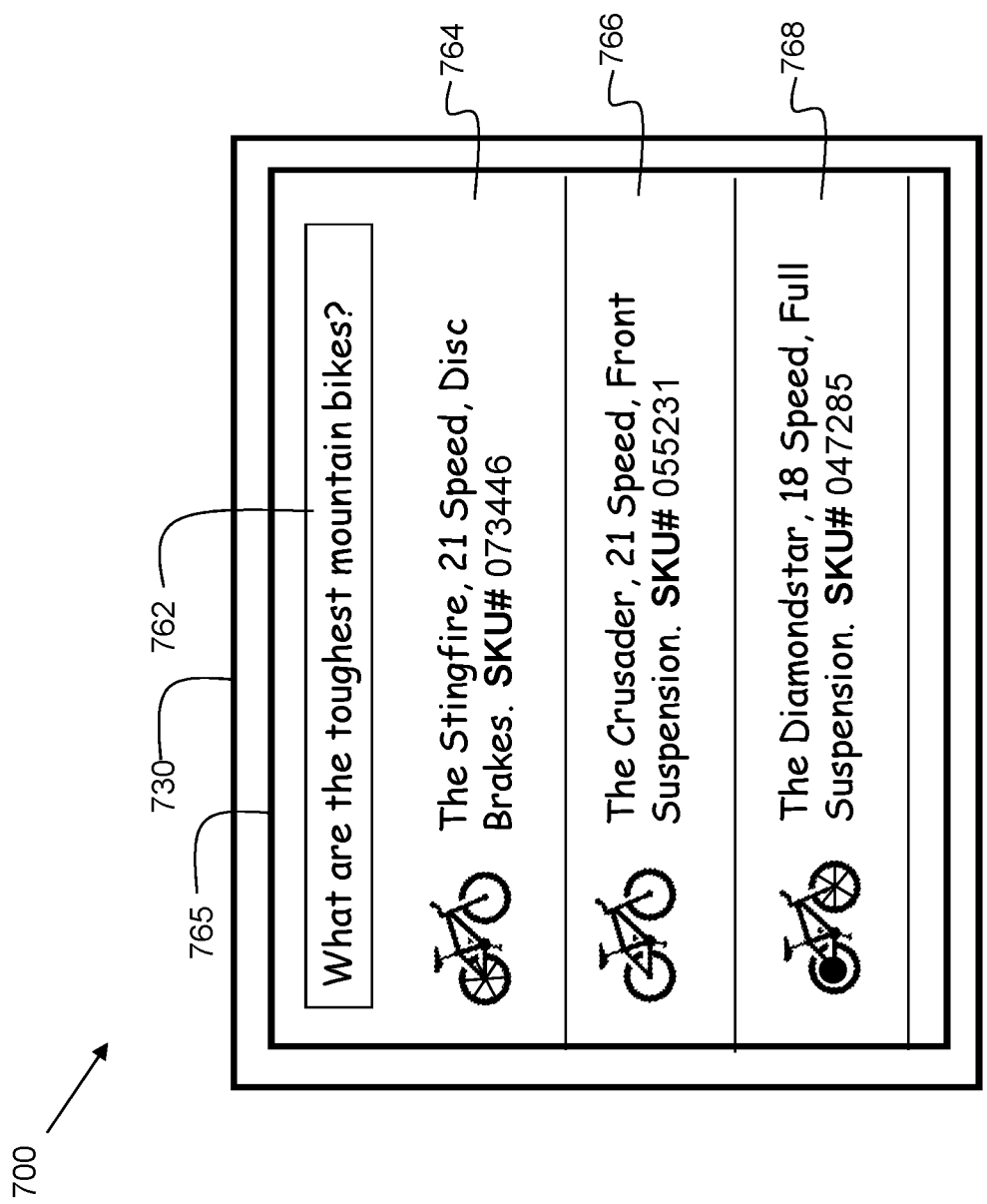
FIG. 7 shows an exemplary modified search result in accordance with embodiments of the present invention.

FIG. 7 shows an exemplary modified search result 700 in accordance with embodiments of the present invention. In an example implementation, a user enters a search query to a field 762 of search engine browser page 765 via client device 730. The query may say "What are the toughest mountain bikes". The server associates such query with statement stored in the ground truth table 360 (see FIG. 3): "What are the toughest mountain bikes?" Three items 764, 766, and 768 are generated as results from a run of the search query to a field 762 of search engine browser page 765. The items are displayed on the user device screen in order of highest weighted value to lowest weighted value based on the ground truth data in the ground truth table 360, which has been modified since the search results shown in device 330 of FIG. 3. Thus, FIG. 7 shows search results with the bike associated with SKU 073446 shown highest at 764, as compared with FIG. 3, where the bike associated with SKU 073446 is shown lowest at 368. Thus, by modifying the ground truth table, embodiments of the present invention enable improved search results based on user interaction with search data.

The modified ground truth table that is created by disclosed embodiments enables improved relevance in search results. Referring to the aforementioned examples in this disclosure, while the original ground truth table ranked a particular bicycle as durable, the modified ground truth table caused a recalculation of the ranking of the bicycles in terms of durability, based on user interaction with those results. While the aforementioned example referred to bicycles, in practice, disclosed embodiments can be applied to a wide variety of search items and attributes. Subsequent searches, utilizing the modified ground truth table, enable improved relevancy in search results.

It should be recognized that listing the search results in order of higher rank to lowest is one method of prioritizing the search results, and others are included within the scope of the invention. For example, results may be listed with the highest rank values at the bottom of a display screen if a user prefers to scroll upwards through search results. In other examples, higher ranked results may be displayed in a highlighted color, like yellow. In yet other examples, the higher ranked results may be displayed in bold font. Results may be shown with highest ranking at the left with the rankings decreasing towards the rights side, or vice versa.

Embodiments of the present invention can be used for a variety of applications, including, but not limited to, general search engines, knowledge-based systems, machine learning, customer kiosks, and e-commerce applications. Any and all such applications are included with the scope of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for processing a search query, comprising:
   receiving the search query from a user;
   associating the search query with a statement of an entry from a ground truth table, when the entry is in the ground truth table;
   adding the query as the statement to the ground truth table when the statement is not in the ground truth table;
   retrieving a set of search results from the ground truth table;
   presenting the set of search results, with a restatement of the search query, including a stock keeping unit number (SKU) and a numerical ranking associated with the SKU;
   recording an interaction of the user with the set of search results; and
   modifying the ground truth table based on the interaction of the user;
   wherein it is determined that the statement is not in the ground truth table based on a returned value from the search query being below a predetermined threshold.

2. The method of claim 1, wherein the modifying the ground truth table includes adjusting the numerical ranking within an entry of the ground truth table.

3. The method of claim 1, wherein recording an interaction of the user comprises recording a click-through action.

4. The method of claim 1, wherein recording an interaction of the user comprises recording a purchase made by the user of a related item to the set of search results.

5. The method of claim 1, wherein recording an interaction of the user comprises recording a wish list addition action.

6. The method of claim 1, wherein recording an interaction of the user comprises recording a favorite list addition action.

7. The method of claim 1, wherein recording an interaction of the user comprises recording a share action.

8. The method of claim 1, wherein recording an interaction of the user comprises recording a duration spent by the user on the set of search results.

9. The method of claim 1, wherein recording an interaction of the user comprises recording a number of accesses by the user of the set of search results.

10. The method of claim 2, wherein the interaction includes a click-through action, a purchase made by the user of a related item to the set of search results, a wish list addition action, a favorite list addition action, a share action, a duration spent by the user on the set of search results, and a number of accesses by the user of the set of search results.

11. The method of claim 2, wherein the adjusting a ranking within an entry of the ground truth table comprises increasing or decreasing the ranking of the entry.

12. The method of claim 1, wherein modifying the ground truth table includes creating a new entry.

13. A system for processing a search query, comprising:
   a search query server, the search query server comprising:
      a processor;
      a memory coupled to the processor, wherein the memory contains instructions, that when executed by the processor, perform the steps of:
      receiving the search query from a user;
      associating the search query with a statement of an entry from a ground truth table, when the entry is in the ground truth table;
      adding the query as the statement to the ground truth table when the statement is not in the ground truth table;
      retrieving a set of search results from the ground truth table;
      presenting the set of search results, with a restatement of the search query, including a stock keeping unit number (SKU) and a numerical ranking associated with the SKU;
      recording an interaction of the user with the set of search results; and
      modifying the ground truth table based on the recorded interaction of the user;
      wherein it is determined that the statement is not in the ground truth table based on a returned value from the search query being below a predetermined threshold.

14. The system of claim 13, wherein the memory further contains instructions, that when executed by the processor, perform the step of adjusting the numerical ranking within an entry of the ground truth table.

15. The system of claim 13, wherein the memory further contains instructions, that when executed by the processor, perform the steps of recording a click-through action of the user, and wherein modifying the ground truth table is based on the click-through action of the user.

16. The system of claim 13, wherein the memory further contains instructions, that when executed by the processor, perform the steps of recording a purchase action of the user, and wherein modifying the ground truth table is based on the purchase action of the user.

17. The system of claim 13, wherein the memory further contains instructions, that when executed by the processor, perform the steps of recording a wish list addition action of the user, and wherein modifying the ground truth table is based on the wish list addition action of the user.

18. The system of claim 13, wherein the memory further contains instructions, that when executed by the processor, perform the steps of recording a favorite list addition action of the user, and wherein modifying the ground truth table is based on the favorite list addition action of the user.

19. The system of claim 13, wherein the memory further contains instructions, that when executed by the processor, perform the steps of recording a share action of the user, and wherein modifying the ground truth table is based on the share action of the user.

20. A computer program product for processing a search query on an electronic device, comprising a computer readable hardware storage device having program instructions embodied therewith, the program instructions executable by a processor to cause the electronic device to:
  receive the search query from a user;
  associate the search query with a statement of an entry from a ground truth table, when the entry is in the ground truth table;
  add the query as the statement to the ground truth table when the statement is not in the ground truth table;
  retrieve a set of search results from the ground truth table;
  present the set of search results, with a restatement of the search query, including a stock keeping unit number (SKU) and a numerical ranking associated with the SKU;
  record an interaction of the user with the set of search results; and
  modify the ground truth table based on the interaction of the user;
  wherein it is determined that the statement is not in the ground truth table based on a returned value from the search query being below a predetermined threshold.

* * * * *